United States Patent [19]

Doremus et al.

[11] Patent Number: 5,696,818

[45] Date of Patent: Dec. 9, 1997

[54] DELAY ANNOUNCEMENT GROUP AND TIME CONTROLLER FOR A TELEPHONE SYSTEM

[75] Inventors: Lonnie Doremus, Schaumburg; David Blaha, Aurora, both of Ill.

[73] Assignee: Rockwell International Corp., Seal Beach, Calif.

[21] Appl. No.: 527,670

[22] Filed: Sep. 13, 1995

[51] Int. Cl.[6] .................... H04M 3/00; H04M 1/64; H04M 15/00; H04Q 3/64
[52] U.S. Cl. .................... 379/265; 379/88; 379/127; 379/246; 379/309
[58] Field of Search .................... 379/67, 88, 89, 379/127, 142, 246, 265, 266, 309

[56] References Cited

U.S. PATENT DOCUMENTS

| | | | |
|---|---|---|---|
| 5,309,505 | 5/1994 | Szlam et al. | 379/266 X |
| 5,335,269 | 8/1994 | Steinlicht | 379/309 X |
| 5,500,891 | 3/1996 | Harrington et al. | 379/265 |

*Primary Examiner*—Harry S. Hong
*Attorney, Agent, or Firm*—Welsh & Katz, Ltd.

[57] ABSTRACT

A delay announcer groups and delay announcement time controller for a telephone system having a host computer for directing an incoming call based on information provided in the incoming call, for issuing a delay message based on information in the call, and for controlling the time of issuing the delay message based upon information in the incoming call.

13 Claims, 2 Drawing Sheets

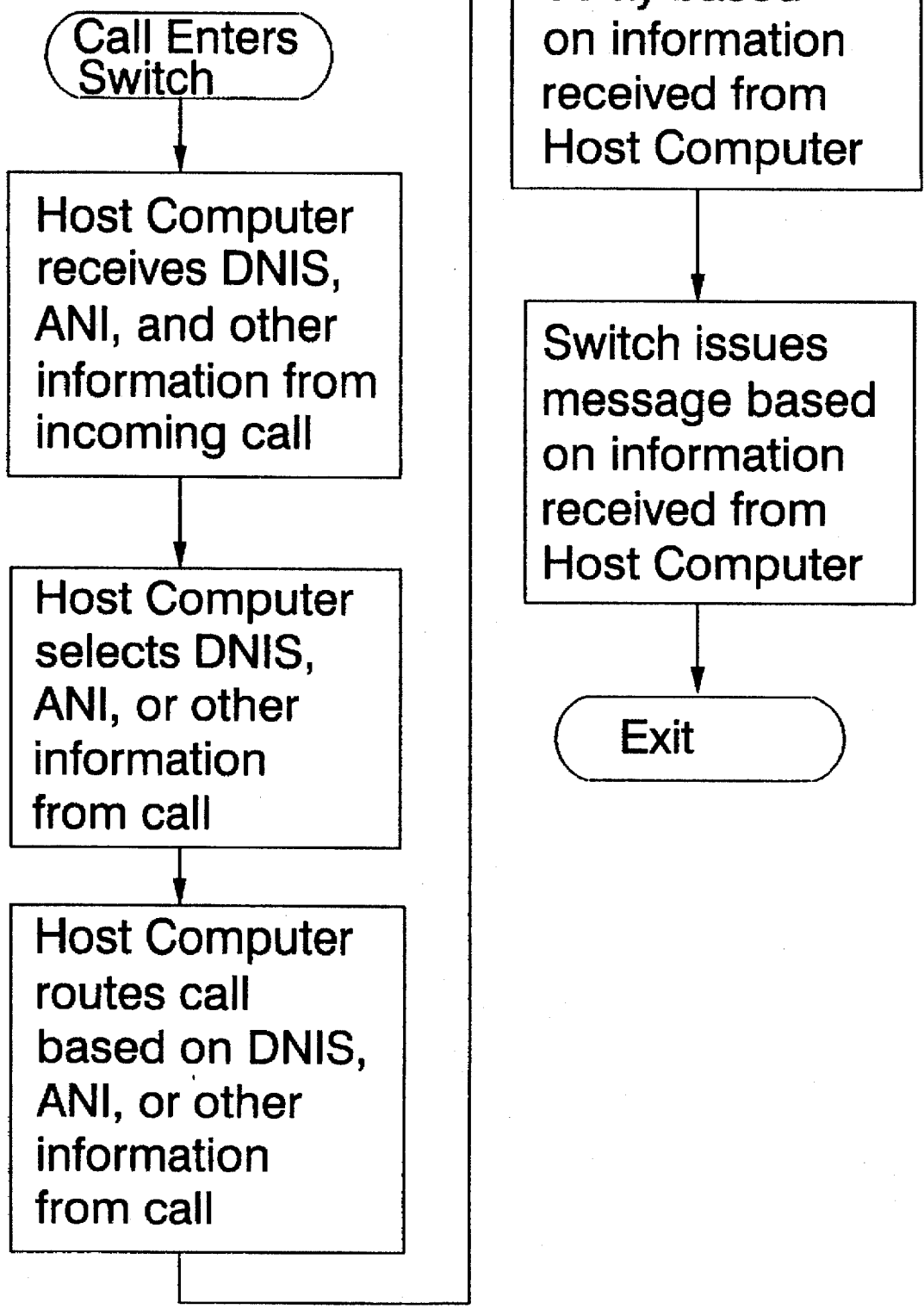

DELAY ANNOUNCEMENT GROUP AND TIME CONTROLLER FOR A TELEPHONE SYSTEM

BACKGROUND OF THE INVENTION

The present invention relates to telephone systems.

In the past, in telephone systems delay announcements are controlled by trunk information groups or by gates the calls are delayed to, with time before the announcer is activated set on a per information or gate basis. In this case, only one delay message is issued irrespective of information in the incoming call.

SUMMARY OF THE INVENTION

A principal feature of the present invention is the provision of a delay announcer group and delay announcement time controller for a telephone system.

The delay announcer group and delay announcement time controller comprises, a host computer having means for directing an incoming call based on information provided in the incoming call, means for issuing a delay message based on information in the call, and means for controlling the time of issuing the delay message based upon information in the incoming call.

A feature of the invention is that the directing means, means for issuing a delay message, and means for controlling time is based upon information in the incoming call, such as DNIS (Dialed Number Identification System) or ANI (Automatic Number Identification), in the host computer.

Another feature of the invention is that the host computer selects different delay messages and different times until the announcement, and is not limited to one message and time.

Further features will become more fully apparent in the following description of the embodiments of the invention and from the appended claims.

DESCRIPTION OF THE DRAWINGS

In the drawings:

FIG. 2 is a flow chart illustrating the procedural steps of operation for the delay announcer group and delay announcement time controller of FIG. 1.

DESCRIPTION OF THE PREFERRED EMBODIMENTS

Figure 1:
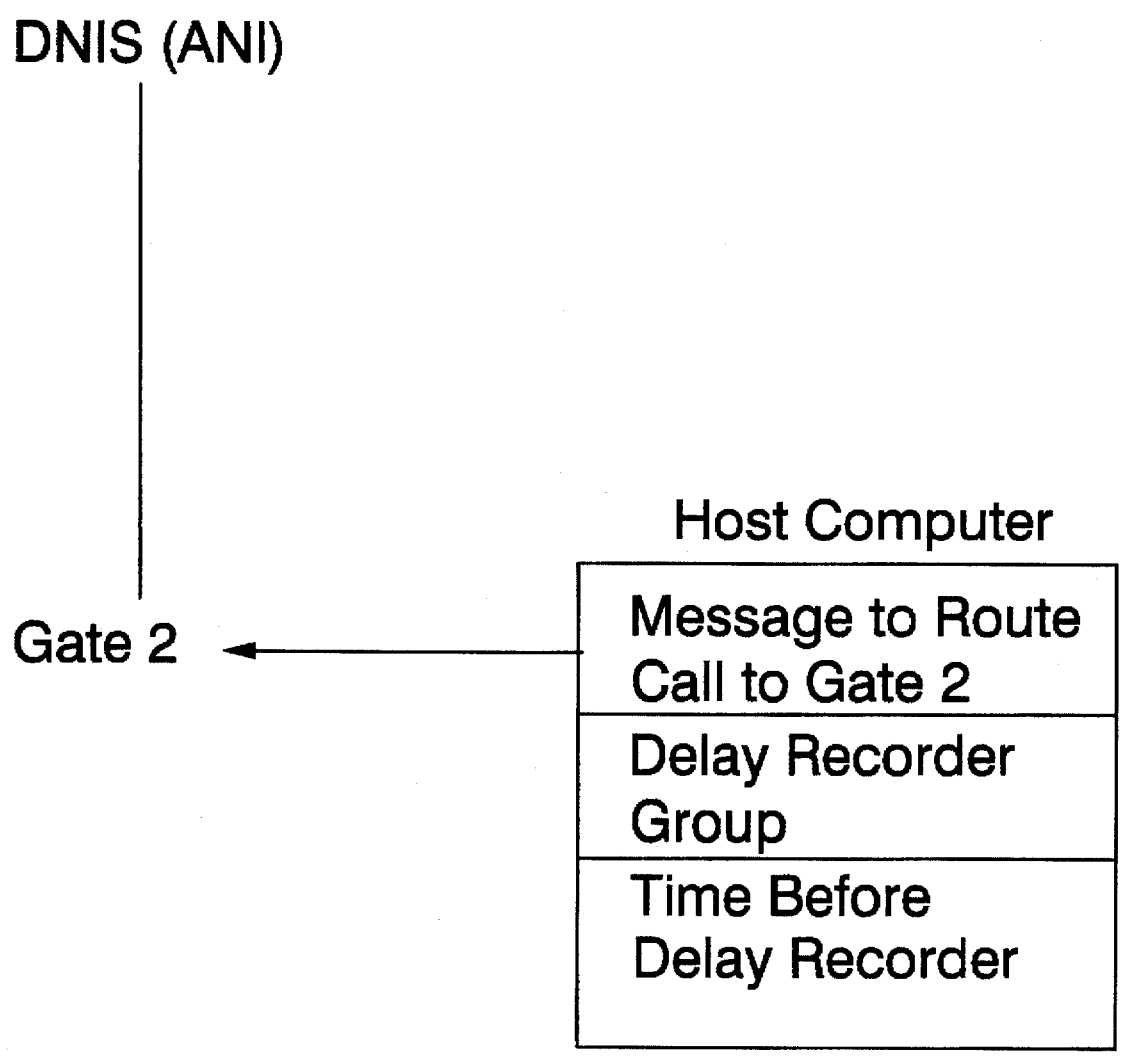
FIG. 1 is a block diagram of a delay announcer group and delay announcement time controller of the present invention.

Referring now to FIG. 1, there is shown a telephone system having a host computer whose actions are based upon information in the incoming call, such as DNIS (Dialed Number Identification System), the number dialed to the switch, or ANI (Automatic Number Identification), the number from which called.

Based upon information in the incoming call, the computer routes the incoming call, in this case to a particular gate such as Gate No. 2 associated with a telephonic switch or automatic call distributor. In addition, the host computer, remotely located and spaced apart from the identified gates for the switch or call distributor issues a delay recorder group to the effect that all operators are busy, and there will be a delay before the call is answered. The delay message is selected by the computer based upon the information in the incoming call, such as DNIS or ANI.

In addition, the host computer selects a time before the delay message is issued. In this case, the time is also selected by the computer based upon information in the incoming call, such as DNIS or ANI.

Thus, in accordance with the present invention an incoming call is routed based upon information in the call. In addition, a particular delay message is selected by the computer based upon information in the call. Further, the time before the delay message is played is selected based-upon information in the call. Accordingly, different delay messages and times may be selected by the host computer based upon information in the incoming call.

A flow chart illustrating the procedural steps performed at the system is shown in FIG. 2. As shown, an incoming call enters a switch or ACD (Automatic Call Distributor). In turn, the host computer receives DNIS, ANI, and other information from the incoming call. The host computer selects DNIS, ANI, or other information from the incoming call. The host computer routes the call based on DNIS, ANI, or other information in the incoming call.

In turn, the switch executes a delay based upon information received from the host computer. The switch then issues a delay message based on information received from the host computer.

The foregoing detailed description has been given for clearness of understanding only, and no unnecessary limitations should be understood therefrom, as modifications will be obvious to those skilled in the art.

What is claimed is:

1. A delay announcer group and delay announcement time controller for a telephone system, comprising:

a host computer having means for directing an incoming call based upon information provided in the incoming call, means for selecting a delay message for play in the telephone system based on information in the incoming call, means for selecting a time for the telephone system to play the selected delay message based on information in the incoming call, and means for controlling the time of playing the selected delay message based upon the selected time for the telephone system to play the selected delay message.

2. The delay announcer group and delay announcement time controller of claim 1 wherein the information in the incoming call is the DNIS (Dialed Number Identification System).

3. The delay announcer group and delay announcement time controller of claim 1 wherein the information in the incoming call is the ANI (Automatic Number Identification).

4. A telephone system including a delay announcer group and delay announcement time controller comprising:

a host computer having means for receiving information from an incoming call, selecting information from the incoming call, routing the call based upon information from the incoming call, selecting a delay based upon information from the incoming call, and selecting a delay message based upon information from the incoming call; and a switch remotely located apart from the host computer having means for receiving information from the host computer, executing the delay selected by the host computer, and issuing the delay message selected by the host computer.

5. A method for playing a delay message by a telephone switch to a caller, comprising the steps of:

a) receiving a telephone call from the caller at the telephone switch;

b) receiving call information associated with the telephone call;

c) selecting at least one call attribute from the call information;

d) selecting a delay message based on the call attribute;

e) selecting a delay to execute based on the call attribute;

f) executing the delay; and g) playing the delay message to the caller through the telephone switch.

6. The method of claim 5 wherein the step of selecting at least one call attribute from the call information comprises the step of selecting ANI information.

7. The method of claim 5 wherein the step of selecting at least one call attribute from the call information comprises the step of selecting DNIS information.

8. The method of claim 5 wherein the step of selecting at least one call attribute from the call information is performed by a host computer located remotely from the telephone switch.

9. The method of claim 5 wherein the step of selecting a delay message based on the call attribute is performed by a host computer located remotely from the telephone switch.

10. The method of claim 5 wherein the step of selecting a delay to execute based on the call attribute is performed by a host computer located remotely from the telephone switch.

11. The method of claim 5 wherein the step of executing the delay is performed by the telephone switch.

12. The method of claim 5 wherein the step of executing the delay is performed by a host computer located remotely from the telephone switch.

13. The method of claim 5 further comprising the steps of:

a) transmitting the call information from the telephone switch to a host computer;

b) transmitting the delay message from the host computer to the telephone switch; and c) transmitting the delay from the host computer to the telephone switch.

* * * * *